United States Patent [19]

Fields

[11] 4,165,893
[45] Aug. 28, 1979

[54] CONNECTOR FOR TUBING

[76] Inventor: Robert E. Fields, 51 Norfolk St., Cambridge, England

[21] Appl. No.: 800,670

[22] Filed: May 26, 1977

[30] Foreign Application Priority Data

Jun. 4, 1976 [GB] United Kingdom ............... 23116/76

[51] Int. Cl.² ....................... F16L 13/00; F16L 19/02; F16L 41/08; F16L 47/00
[52] U.S. Cl. ..................................... 285/177; 285/39; 285/89; 285/158; 285/161; 285/328; 285/336; 285/339; 285/346; 285/348; 285/352; 285/423; 403/19
[58] Field of Search ............... 285/340, 356, 357, 351, 285/352, 369, 348, 379, 39, 89, 423, DIG. 10, 158, 238, 345, 346, 177, 161, 331, 336, 328, 245; 403/19

[56] References Cited

U.S. PATENT DOCUMENTS

| 781,157 | 1/1905 | Powell | 285/331 X |
|---|---|---|---|
| 918,843 | 4/1909 | Glidden | 285/348 |
| 919,913 | 4/1909 | Miller | 285/328 X |
| 1,767,323 | 6/1930 | Staples | 285/158 X |
| 2,787,480 | 4/1957 | Staller | 285/177 X |
| 2,816,472 | 12/1957 | Boughton | 285/348 X |
| 2,932,314 | 4/1960 | Stephans | 285/89 X |
| 3,284,106 | 11/1966 | McIntosh et al. | 285/336 X |
| 3,404,905 | 10/1968 | Albrecht | 285/348 X |
| 3,679,241 | 7/1972 | Hoffmann | 285/340 |
| 3,695,640 | 10/1972 | Clague | 285/379 X |
| 3,817,561 | 6/1974 | Kay | 285/345 X |
| 3,880,452 | 4/1975 | Fields | 285/351 X |
| 3,884,509 | 5/1975 | Marsh, Jr. | 285/348 X |

FOREIGN PATENT DOCUMENTS

| 182919 | 8/1955 | Austria | 285/348 |
|---|---|---|---|
| 549166 | 11/1957 | Canada | 285/356 |
| 1154351 | 4/1958 | France | 285/423 |
| 2242630 | 3/1975 | France | 285/352 |
| 895461 | 5/1962 | United Kingdom | 285/340 |

Primary Examiner—Mervin Stein
Assistant Examiner—Carl F. Pietruszka
Attorney, Agent, or Firm—Allison C. Collard; Thomas M. Galgano

[57] ABSTRACT

A connector is described for joining tubes together, particularly plastics tubing as used in laboratories and the like.

The connector comprises a first member having a barb-like projection through which the tube can be pushed but cannot be pulled in the reverse direction due to the interaction between the barb-like projection and the surface of the tube. The protruding captive end of the tube passes through a resiliently deformable disc of plastics material preferably Polytetrafluroethylene and in a preferred embodiment the disc is partly housed in a cup-shaped extension from the first member.

The assembly of first member and disc is secured within a sleeve by means of a screw-thread engagement between the said sleeve and a further member which acts on the rear of the said first member. The said further member is screw-threadedly advanced into or onto the sleeve.

A screwdriver slot is formed at the end of the said further member and a transverse slot intersects the screwdriver slot to allow the tube extending therethrough to be pushed to one side or the other to facilitate the insertion of a screwdriver blade or the like tool.

In one embodiment the end face of the plastics disc is plain for seating against a corresponding plain end face of a similar plastics disc or seating within the sleeve. In another embodiment the sleeve is formed with two conical seatings at opposite ends joined by a through-bore and the discs are formed with complementary conical mating surfaces.

7 Claims, 7 Drawing Figures

CONNECTOR FOR TUBING

FIELD OF THE INVENTION

This invention relates to connectors for tubes and in particular to connectors capable of being connected in fluid-tight manner to plastics tubing, typically for laboratory use.

PRIOR ART

A connector is described in the Specification of my U.S. Pat. No. 3,880,452 which can be used to interconnect tubes of different diameters for example for use with laboratory equipment and which comprises an inner tubular member with a central through passage and a concave frusto-conical orifice at one or both ends. One or more ring seals surround the tube in the orifice and a cup-shaped outer cap has a central aperture to accommodate the tube and a side wall which surrounds the ring seal or seals and the inner tubular member. The cup-shaped members are threaded and are held in position by means of the engagement of the thread on a complementary thread form on the inner tubular member.

In one embodiment the ring seal is shown in the form of a conical member adapted to be located in the concave frusto-conical orifice, the conical member being formed with a central through aperture through which the end of a tube can be threaded. This fitting was designed for low pressure applications in which total chemical inertness is necessary in the fitting. As the conical member is held to the end of its tube only by an interference fit it is not suitable for use with pressures greater than 100 lb/sq.in.

An alternative connector for operation at higher pressures is known, comprising an inner tubular member having a through passage formed with internal thread profile at each end into which can be screwed from opposite ends two end plugs each having through passages which are aligned by the inner tubular member. The tubes or conduits extend through the through passages within the plug members and the opposed internal ends of the two tubes or conduits are formed with radial flanges and a seal is formed between the flanges by tightening one plug member relative to the other so that the opposed faces of the flanges abut and the flanges are subjected to axial compression due to the tightening action of the screwed-in plug members. It is known to provide thrust washers between the rear faces of the flanges and the inner ends of the plug members.

For a fluid-tight seal to be obtained with this alternative form of connector, it is essential that both ends of the tubing to be joined must be flared accurately and at right angles to the axes of the tubes. It is found in practice that if the flaring of the tube is incomplete or not symmetrical the compression exerted on the flanges is insufficient to prevent leaks from developing with time. This problem is accentuated by the fact that a high proportion of the plastics tubing with which such connectors are to be used is formed from Polytetrafluoroethylene (PTFE) and under pressure Polytetrafluoroethylene is known to deform. Hence the flanges of the tube, if not of equal thickness will relieve stress in such a way that a new leak will appear at a point where the flange is of less thickness. If the flanging is not symmetrical a further difficulty occurs in that the compressed PTFE near the area where the two central through passages are pressed together will partly occlude the passage; as the fitting is further tightened a further restriction in the passage is caused at this point. Owing to the difficulty in forming a symmetrical flange at right angles on the end of a piece of PTFE tubing (even with automatic tools) a connector that depends on such a flare, is of limited use when the fluid is corrosive, harmful to health or its loss results in a change of volume in the fluid in the apparatus and thus affects an experimental parameter.

OBJECTS OF THE INVENTION

An object of the present invention therefore is to provide an improved connector for connecting tubes in which flaring of the tube ends is not required, and which can be used with confidence at elevated pressures, up to at least 200 lbs per sq. inch.

It is another object of the invention to provide a male connector part which can be fitted onto existing tubing and fitted into existing female parts of known connectors.

It is another object of the invention to provide a connector in which the tube is automatically centred and aligned with the tubing to which it is to be joined.

It is another object of the present invention to provide a connector for tubing particularly plastics tubing which is readily adapted to be fitted to an apertured plate to extend therethrough and provide a permanent or semi-permanent mounting for the connector.

It is another object of the present invention to provide a connector for plastics tubing in which a resiliently deformable member constitutes at least one of the sealing surfaces and deformation of the resiliently deformable member is restricted to an axial direction.

It is a further object of the invention to provide a connector for joining plastics tubing and the like which can be made and re-made so as to always give the same degree of sealing.

THE INVENTION

According to the present invention a connector for a tube comprises a first member having a central aperture through which a tube can be pushed in one direction but which includes a barb-like projection which bites into the wall of a tube and prevents the latter from being pulled therethrough in the opposite direction, a disc member of resiliently deformable plastics material through which the captive protruding end of a tube can pass to terminate flush with the free end face of the disc member and means for securing the assembly of disc member and first member within a sleeve.

A connector will in practice be fitted to a tube to allow the latter to be connected to a sleeve, the connector being secured at one end of the sleeve.

Two tubes may be joined by securing a second fitting into the other end of the sleeve.

The sleeve may include an annular member against which the opposed disc members abut. Alternatively the two assemblies are secured in the sleeve so that the two disc members are in tight abutting relation.

The means for securing an assembly within the sleeve may comprise a screw-threaded engagement between the first member and the sleeve or between a further member which acts on the first member and is threadedly engaged with a thread profile on or in the sleeve.

The first member may comprise an apertured plate or a cup-shaped member which contains at least part of the resiliently deformable disc member.

The disc conveniently includes a plain rear surface for abutting the first member but may have any convenient form of leading end face for abutting the annular member or other member within the sleeve.

In one embodiment the leading end face of the disc member is cone-shaped.

Preferably however the leading end face of the disc member is plain as is the rear face.

It will be seen that by providing a reasonably thick resiliently deformable disc member, a cushioned seating can be provided around the end of the tube which will provide a good seal against an abutting face, particularly if the latter is also formed from resiliently deformable material.

Preferably the disc is formed from Polytetrafluorethylene (PTFE) and a preferred material is Teflon.

The invention is of particular use with tubing also formed from PTFE or Teflon but can be applied to tubing formed from most plastics materials.

The first member (which constitutes a thrust plate and will be referred to as such) may be formed from plastics or metal but is preferably formed from metal so that the barb-like protrusion in the aperture in the plate is strong enough to resist the reverse movement of the tube therethrough.

A preferred form of barb-like protrusion comprises an annular blade of triangular cross section and formed integrally with the wall surface of the aperture in the plate and pointing both radially inwardly and in the direction in which the tube is pushed through the thrust plate with the inclined surface defining the longer edge of the triangular section blade making an angle of 160° relative to the wall of the aperture in the thrust plate on the entry side of the blade. In a typical example standardized to accept one sixteenth of an inch (1.59 millimeter) o.d. tubing the main aperture in the plate is formed with a diameter of 1.6 mms and the annular blade defines a sharp edge at the end of the shallow sloping annular face having a diameter of 1.45 mms, the diameter of the remainder of the aperture beyond the blade corresponding to the original entrance diameter of 1.6 mms.

Preferably means (typically in the form of a lock nut but not necessarily so) is provided for locking the means for securing the thrust plate to the sleeve to prevent the thrust plate and sleeve from becoming undone due to vibration and the like.

Where the thrust plate is located between the disc of resiliently deformable plastics material on the one hand and a further member adapted to be screwed into the sleeve on the other hand, the locking nut may be threaded on the threaded exterior of the said further member and the locking nut can be tightened against the end of the sleeve. Where the connector is to be mounted on a bracket or through a plate, the most convenient manner is to form a hole through which the threaded further member can be fitted so that the locking nut abuts one side of the hole and the end of the sleeve abuts the other side of the hole when the said further member is screwed into the sleeve. By tightening the locking nut relative to the sleeve the connector can be secured to the bracket or plate.

To facilitate gripping and tightening the sleeve, the latter may be formed with a hexagonal or square nut profile over at least part of its length. Alternatively at least a part of the surface of the sleeve may be formed with serrations or indentations or may be otherwise roughened to provide a better key for gripping the sleeve.

A male part of a connector according to the invention comprises a resiliently deformable disc member on the end of a tube, a thrust plate having an inner barb-like radial projection which engages the outer surface of the tube and a further thrust member behind the thrust plate for screwing into the sleeve. Such a male part can be used in place of the male parts of known connectors having a thrust member adapted to be screwed into a sleeve and a metal washer which is sandwiched between the leading end of the said thrust member and a trumpet-shaped flared end of the tube formed by the prior art procedures already outlined. In this form therefore the invention is compatible with existing fittings.

Where a further thrust member acts on the rear of the thrust plate and is further adapted to be screw-threadedly joined to the sleeve, the said further thrust member preferably includes a through-bore which tapers in diameter towards the end which abuts the thrust plate until at that end the diameter is only just sufficient to allow the tube to be pushed therethrough. In this way the tube is held radially aligned with the central axis of the said further thrust member which since it is screw-threadedly engaged on or in the sleeve will accurately locate the tube on the central axis of the sleeve. By aligning the axis of the opening in the annular member provided within the sleeve or the opposed end of the male part of the connector (the latter of which is also held captive within the sleeve) with the axis of the sleeve, perfect axial alignment of the two tubes within the sleeve is made possible. Where they are of the same diameter this means that the interior of the passage formed by the two abutting tubes is to all intents and purposes continuous and there is no step or ridge at the join nor an annular cavity which can cause blockage and turbulence and other problems.

Preferably the end of the said further thrust member through which the tube passes and which has to be tightened into or onto the sleeve includes a screwdriver slot and a further slot at an angle to the screwdriver slot into which the tube can be displaced from the central position normally occupied by the tube to permit a screwdriver blade to be inserted into the screwdriver slot.

In addition to, or instead of, the screwdriver slot, the said further thrust member may include a hexagonal or square nut profile to allow the member to be gripped by a spanner or wrench for turning and tightening into or onto the sleeve.

When a connection is formed between two tubes in accordance with the invention, the compressive forces do not tend to occlude the internal passage of the tube as can occur in prior art connections in which two tubes are joined by abutting radial end-flanges and in which deformation of the end-flanges can occur in a way so as to occlude the internal tube passage. The action of the barb provided by the invention, is to cut into and impale itself on the surface of the tube and by choosing a shallow angle as in the preferred example given above, so the tendency will be for the tube to be driven up onto the annular barb and the diameter of the tube will be maintained rather than the reverse. This reduces the risk of turbulence occurring.

Preferably the resiliently deformable member is formed from Teflon and is contained within a cap of metal (preferably stainless steel) so that only a very small section of the resiliently deformable member in the region of the leading sealing face thereof is exposed. In this way cold flow deformation of the material is minimized and the resilience of the material is increased when it is axially compressed between the thrust plate and the cooperating surface into which it is brought into contact.

The invention is intended to replace the prior art connectors in which the end of the tube is flared as hereinbefore described. The prior art devices suffer from two major disadvantages neither of which are present in the design according to the invention:

(1) By its very nature the thickness of the radial flange formed at the end of a tube is very small and the thin section of this flange is liable to contract as between operating temperatures and room temperatures and below with the result that leaks can readily occur if the equipment is operated at high temperature and then subsequently cooled and operated at a lower temperature. The effectiveness of the thin flared end as a seal thrust is poor having regard to temperature variation but this is not the case with a large chunk of Teflon which is held captive in a metal cap forming the thrust plate and which is axially compressed so as to provide the seal.

(2) A flared end of the tube formed in accordance with the prior art is rarely if ever symmetrical and when a joint is initially made in accordance with the prior art and the two flared ends are brought together in abutting relationship and compressed, the annular radial flanges formed by the flaring deform to accommodate assymmetry in the two flanges. If the joint is subsequently broken and then re-made it is not usual for the two flanges to be re-located in exactly the same circular relationship as when the joint was first made (so as to enable the deformities in the two flanges to cooperate). Instead the non-aligned, deformed flanges now make it difficult to achieve a good joint, and when the flanges are compressed new deformation occurs, some of it radially inwards, to occlude or partially occlude the tube inner passage. Repeated making and re-making of connections with these prior art connectors thins the flanges or blocks the internal flow through the tube, necessitating re-flanging of the tube end.

PRIOR ART EMBODIMENT

Figure 1:
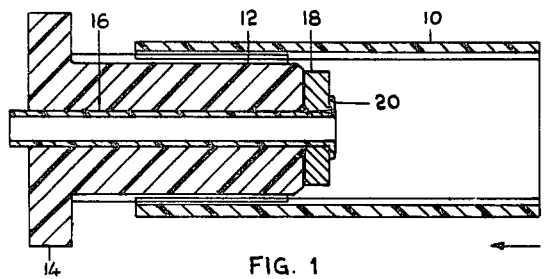
FIG. 1 is a cross section through a partly assembled connector constructed in accordance with the prior art.
Figure 2:
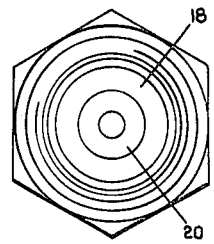
FIG. 2 is an end view of the partially assembled connector in the direction of the arrow in FIG. 1.

FIGS. 1 and 2 illustrate a known type of connector or coupling for joining together two lengths of plastics tubing which may be of the same diameter or different diameters. In FIGS. 1 and 2 only one length of tubing is shown and one half of the connector. The other half of the connector is a mirror image of the first half.

The prior art connector comprises a cylindrical sleeve 10 formed internally with a screw thread into which plug members can be screwed from opposite ends. One of the plug members 12 is shown. The rear end of each plug member includes a hexagonal nut profile 14 to allow the plug 12 to be tightened into position and also includes an axial through-bore through which a plastics tube 16 is pushed.

At the inner end of the plug 12 is located a washer 18 usually of metal or very hard plastics material and the tube is held in position by forming a flange at the inner end of the tube as denoted by reference numeral 20. The flange is formed by drawing the end of the tube which protrudes beyond the washer 18 and forming a right-angled annular flange from the drawn tube. Plastics materials which are particularly suitable for this process are the Polytetrafluroethylene plastics commonly sold under the Trade Name Teflon.

A joint is made between the length of the tube 16 and another length of tube by forming a second insert for screwing into the sleeve 10 from a second plug member and washer (not shown) threaded over a second length of tube (not shown) the inner end of which is in a similar way to that of tube 16, formed into an annular flange. By screwing the second plug into the sleeve 10 so that the annular flange at the inner end of the second plug member (not shown) is brought into close abutting relationship with the first flange 20 and tightening the two plug members so a butt between the two tubes is formed.

Disadvantages of this type of joint have been enumerated above. A further disadvantage is that the joint relies solely on the axial thrust across the two flange surfaces and this in turn is reliant upon the two plug members remaining tightly screwed into place. Any vibration can cause the two plug members to work loose and immediately the joint is broken.

FIG. 2 is merely an end view of the assembly of FIG. 1 in the direction of the arrow in FIG. 1. This shows the circular end flange 20 of the captive tube 16 concentrically situated relative to the circular thrust washer 18. FIG. 2 demonstrates just how small is the flange 20 on which the joint relies for sealing. Any irregularity or deformity in a flange of such proportions will obviously result in a breakdown of the seal.

DESCRIPTION OF THE EMBODIMENTS OF THE INVENTION

Figure 3:
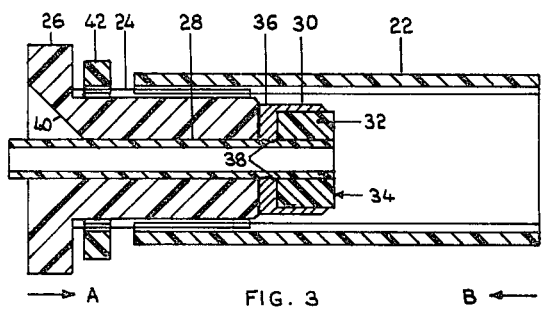
FIG. 3 is a cross section side view of a partly assembled connector constructed in accordance with one embodiment of the present invention.

FIGS. 3 to 6 illustrate a first embodiment of the invention. This connector like the prior art one comprises a cylindrical sleeve 22 into which can be fitted from opposite ends plug members similar to the member 12, 14 of FIG. 1. In FIG. 3 only one such plug member is shown designated 24 having a hexagonal nut profile at the outer end 26.

In order to allow compatibility between an embodiment of the invention and prior art connectors, the diameter of the plug member 24 is made the same as the diameter of the plug member 12 and the screw thread profile of the plug 24 is made the same as that of the plug 12. The internal screw thread profile of the sleeve 22 is made the same as that of sleeve 10. Externally the sleeve 22 is round (as shown) or may be formed with a hexagonal or square nut profile.

A tube 28 extends through a central through-bore in the plug member 24 and through a retaining cup member 30 and through a similar axial through-bore in a cylindrical block of resiliently deformable plastics material such as Polytetrafluorethylene generally designated by reference numeral 32. This cylindrical block 32 is held captive within the cup member 30 and includes a plain end face 34. The end of the tube 28 which initially protrudes beyond the plain end face 34 is cut off flush with that end face.

The cup member 30 includes a thrust plate section 36 which includes a central circular aperture through which the tube 28 extends. The internal wall of the aperture in the plate 36 is formed with an annular angled blade 38 the sharp edge of which points in the direction in which the tube 28 is pushed through the aperture. The dimensions of the annular blade are such that if the tube is pulled in a rearward direction (to the left as shown in FIG. 3) the annular blade bites into the external surface of the tube 28 and prevents the latter from being moved. The annular blade 38 can thus be said to constitute a barb-like projection having the same characteristics as a fish-hook which will allow the tube 28 to be pushed into the fitting in one direction but prevents the tube from being withdrawn.

In order to ensure that the sharp edge of the blade 38 will cut into the tube 28, the diameter of the edge of the blade is made just less than the outside diameter of the plastics tubing 28.

It is worth mentioning that the assembly of the tube 28 into the fitting comprising the plug 24 and assembly of end cap 30 and cylindrical block 32 is facilitated if, after it has been pushed through all these members so as to protrude beyond the plain end face 34, the tube 28 is then pulled sharply in a rearward direction so as to impale the wall of the tube onto the sharp edge of the blade 38 before the end of the tube protruding beyond the plain end face 34 is trimmed.

Figure 4:
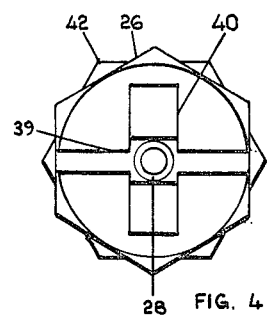
FIG. 4 is an end view in the direction of the arrow A in FIG. 3.
Figure 5:
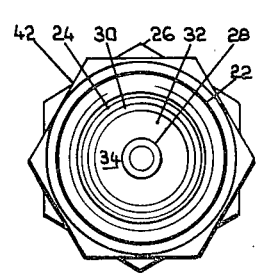
FIG. 5 is an end view in the direction of the arrow B in FIG. 3.

FIGS. 4 and 5 are end views of the assembly shown in FIG. 3 from the left hand and right hand end respectively. FIG. 4 illustrates the various features of the hexagonal nut form 26. The tube 28 extends through a central hole and a screwdriver slot 39 extends diametrically across the end of the nut 26. A triangular wedge-shaped slot is formed at right angles to the screwdriver slot 39 and both intersect the center of the nut. The wedge-shaped slot is designated by reference numeral 40 and serves to accommodate the tube 28 to one side or the other of the screwdriver slot to allow a screwdriver blade or other tool to be inserted into the slot 39. After the screwdriver has been removed the tube 28 can revert to its normal axial position as shown.

At the opposite end of the plug member 24, the end of the tube 28 can be seen centrally of the plain circular end face 34 of the cylindrical block 32 of resiliently deformable plastics material. As previously mentioned this is conveniently Polytetrafluorethylene as sold under the Trade Name Teflon. The end cap 30 which is typically formed from stainless steel can also be seen around the block 32, in FIG. 5.

Reverting to FIG. 3, a lock nut 42 is shown threadedly engaged on the exterior of the plug member 24. The lock nut can be tightened against the end of the sleeve 22 so as to lock the plug member 24 into position.

Figure 6:
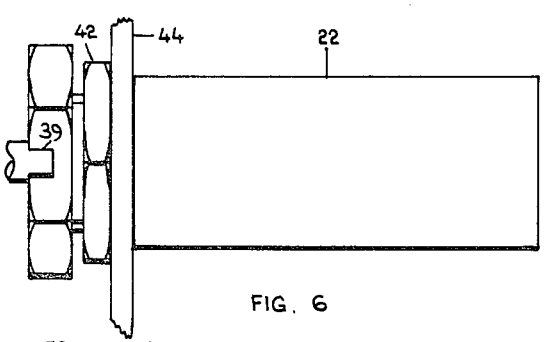
FIG. 6 is a side view (not cross sectioned) of the embodiment shown in FIG. 3 when mounted on a plate.

FIG. 6 is a side view of the part assembled connector of FIG. 3 and shows how the unit can be mounted through a hole in a plate 44. The connector is assembled to the plate by introducing the plug member 24 through a hole (not shown) in the plate 44 and then screwing the sleeve 22 onto the protruding end of the plug member 24 until the plate 44 is trapped between the lock nut 42 on one side and the annular end of the sleeve 22 on the other side.

Figure 7:
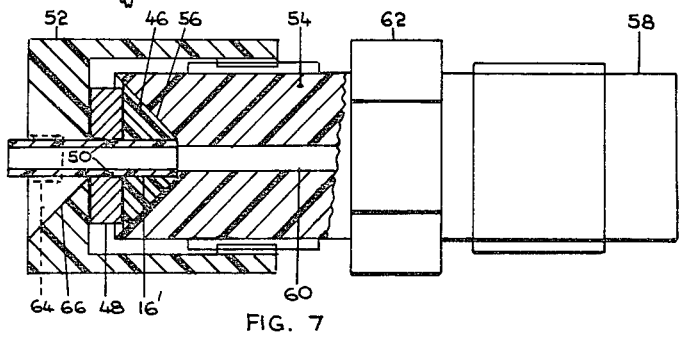
FIG. 7 is a side view partly in cross section of a partly assembled connector constructed as another embodiment of the invention.

FIG. 7 illustrates another embodiment of the invention in which the cylindrical block 32 of resiliently deformable plastics material is replaced by a frusto-conical shaped block of the same material 46. The smaller end of the member 46 is flush with the end of the tube 16' and a thrust plate 48 having a barb-like annular blade 50 similar to that described with reference to the embodiment of FIG. 3, is fitted behind the larger face of the frusto-conical member 46.

The thrust member 48 which can be likened to a thrust washer is preferably of metal such as stainless steel and is held captive by means of an end cap 52 which is threadedly engaged on a sleeve 54. The end of the sleeve is formed with a frusto-conical recess 56 which cooperates with the frusto-conical member 46 to form a seal. By tightening the member 52 onto the sleeve 54 so the frusto-conical member 46 becomes trapped between the thrust plate 48 and the conical seating 56 and a good seal is formed.

The opposite end of the sleeve 54 generally designated 58 is formed in the same way as the left hand end with a conical recess and a concentric through-bore 60 communicates between the two ends of the sleeve.

A hexagonal nut profile 62 is formed centrally of the sleeve 54 to permit the latter to be gripped by a spanner or the like for tightening.

The end of the cap member 52 is formed with a screwdriver slot 64 and a transverse wedge-shaped slot 66 in the same way as is shown for the hexagonal nut form in FIG. 4. In this way the tube 16' can be moved to one side or the other into the slot 66 to facilitate the insertion of a screwdriver blade or like tool into the slot 64.

Although not shown locking nuts may be provided, threadedly engaged on the sleeve 54 to tightly hold the end caps 52 in position.

Conveniently the sleeve 54 and end caps 52 are also formed from Polytetrafluorethylene as is the tube 16'.

I claim:

1. A connector and tube assembly, comprising:
   a first member having a continuous internal wall surface which defines a central aperture extending through said first member having first and second opposite open ends;
   a tube which is received within said central aperture by being pushed through said first open end thereof, said tube having an end which protrudes beyond said second open end of said aperture when said tube is fully inserted within said aperture of said first member;
   a barb-like projection disposed within said aperture which extends generally radially inwardly relative to the axis of said aperture and generally rearwardly toward said second open end of said aperture, said barb-like projection being the sole means for securing said tube within said aperture and being disposed to bite into said tube when said tube is initially inserted into said aperture so as to prevent said tube from being pulled through said aperture in an opposite direction to that in which it was inserted in said aperture;
   a resiliently-deformable, plastic, annular disc member being disposed adjacent to said first member and through which the protruding end of said tube passes, said disc member having an end face which lies flush with said end of said tube, said disc member and said first member cooperatively defining a subassembly;

a sleeve within which said subassembly is disposed; and means for securing said subassembly within one end of said sleeve.

2. The assembly according to claim 1, wherein said barb-like projection comprises an annular blade having triangular cross-section which is formed integrally with said wall surface of said first member.

3. The assembly according to claim 1, wherein said sleeve has an internally-threaded surface and wherein said means for securing said assembly in said sleeve comprises a further member having an externally-threaded surface threadably engaged with said internally-threaded surface of said sleeve, said further member having an aperture extending therethrough and through which said tube passes and an inner end face which abuts said first member.

4. The assembly according to claim 3, wherein said assembly further includes locking means threadably-secured on said externally-threaded surface of said further member and a mounting plate having an aperture extending therethrough which is disposed on said further member with said locking means on one side and said end of said sleeve on the other side thereof.

5. The assembly according to claim 4, wherein said further member is tubular and includes a through bore through which said tube extends, the diameter of which is reduced at said inner end thereof which abuts said first member so as to accurately locate said tube which extends therethrough.

6. The assembly according to claim 3, wherein said further member has an outer end face having a screwdriver slot formed therein.

7. The assembly according to claim 6, wherein said outer end face has formed therein a second slot which is disposed at an angle to said screwdriver slot so as to allow a tube protruding beyond the outer end face of said further member to be pushed to one side to permit entry of a blade of a tool into said screwdriver slot.

* * * * *